United States Patent [19]

Kim

[11] Patent Number: 5,598,742
[45] Date of Patent: Feb. 4, 1997

[54] AUXILIARY STEERING DEVICE FOR VEHICLE

[76] Inventor: Ki W. Kim, Chun Ho Woo Sung Apt. 2-1005, 19-2 Chun Ho 1st Dong, Rep. of Korea

[21] Appl. No.: 377,739

[22] Filed: Jan. 25, 1995

[30] Foreign Application Priority Data

Jan. 25, 1994 [KR] Rep. of Korea .................. 1994 1279

[51] Int. Cl.$^6$ ....................................................... B62D 1/22
[52] U.S. Cl. ................... 74/494; 74/481; 74/561; 74/513; 403/53; 403/59
[58] Field of Search ................... 74/494, 481, 561, 74/512, 513; 403/53, 59, 131

[56] References Cited

U.S. PATENT DOCUMENTS

| | | | |
|---|---|---|---|
| 852,034 | 4/1907 | Pierce | 74/561 |
| 1,067,892 | 7/1915 | Walters | 403/131 |
| 1,114,817 | 10/1914 | Steiner et al. | 74/494 |
| 1,196,616 | 8/1916 | Thompson | 74/494 |
| 1,257,601 | 2/1918 | Haley | 74/494 |
| 1,540,608 | 6/1925 | Dawson et al. | 74/494 |
| 2,863,329 | 12/1958 | Montgomery | 74/513 |
| 3,103,905 | 9/1963 | Althens et al. | 74/561 |
| 3,731,663 | 5/1973 | Hollins | 74/513 |
| 3,863,519 | 2/1975 | Natori | 74/513 |
| 4,154,544 | 5/1979 | Gair | 403/59 |
| 4,726,441 | 2/1988 | Conley | |
| 4,756,552 | 7/1988 | Martinez et al. | |
| 5,203,214 | 4/1993 | Frisbee et al. | 74/513 |

FOREIGN PATENT DOCUMENTS 60-174363  9/1985  Japan .
62-97878  6/1987  Japan .

*Primary Examiner*—Charles A. Marmor
*Assistant Examiner*—David Fenstermacher
*Attorney, Agent, or Firm*—Keck, Mahin & Cate

[57] ABSTRACT

An auxiliary steering device having a steering pedal allows a main steering system to be controlled by either the hand-operated steering wheel or the foot-operated steering pedal. The device has a lift lever for enlarging the reciprocation angular motion of the steering pedal by leverage, a lever body for turning the direction of the reciprocation angular motion into the right-angled direction and transmitting the reciprocation angular motion to a crank lever, and a connecting rod for converting the angular motion of the lever body into a rotating motion of a drive bevel gear cooperating with a steering drive shaft of the steering wheel.

6 Claims, 7 Drawing Sheets

AUXILIARY STEERING DEVICE FOR VEHICLE

BACKGROUND OF THE INVENTION

1. Field of the Invention

The present invention relates generally to an auxiliary steering device for a vehicle and, more particularly, to the auxiliary steering device with a steering pedal. The auxiliary steering device controls a steering wheel of a main steering system by causing a reciprocation angular motion of the steering pedal converted into a rotating motion of a steering drive shaft, thereby making possible the steering for a vehicle by either the hand-operated steering wheel or the foot-operated steering pedal.

2. Description of the Prior Art

In the prior art, there have been proposed vehicles with auxiliary steering devices as disclosed in U.S. Pat. Nos. 4,726,441 and 4,756,552 and Japanese Patent Laid-open Publication No. Sho. 60-174,363. Each of the vehicles disclosed in the above U.S. patents is provided with a steering system controlled by either a pair of steering wheels, that is, a main steering wheel and an auxiliary steering wheel. The vehicle disclosed in the above Japanese patent is provided with a main steering system having a main steering wheel, as well as an auxiliary steering system having an auxiliary steering handle. In operation of the vehicles disclosed in the above U.S. patents, two operators may sit on opposed sides of the cab respectively in order to selectively operate one of two steering wheels of the steering system. When there is only one operator controlling the steering system, the operator needs to sit on either side of the cab in order to operate either steering wheel of the steering system. The typical steering system having the auxiliary steering wheel or handle, as well as the main steering wheel, require controlling by hand.

As the typical steering systems for vehicles only have the hand-operated steering means, the steering systems cannot allow the operators to be free from hand operation for the steering means during driving of the vehicles even when the operators are tired from driving for a long time. Moreover, it is very difficult to use a portable phone, control the stereo system, enjoy something to eat, drink or smoke, by using one's hands while operating the vehicle. When the operator temporarily separates the hands from the steering wheel or controls the steering wheel using the elbows instead of the hands in order to free the hands for other use, a serious traffic accident may result.

Japanese Utility Model Laid-open Publication No. Sho. 62-97,878 discloses a power steering system with an auxiliary steering device as well as a hand-operated steering wheel, and whose auxiliary steering device has a foot-operated steering pedal for controlling the steering system using one's foot. The above steering system can be thus controlled by either the hand-operated steering wheel or the foot-operated steering pedal. In the above steering system suitable for being used in construction vehicles such as power shovels, the bottom end of a steering drive shaft extending from the steering wheel is coupled to both a metal valve and a booster fixed to a bracket plate of the cab of the vehicle, such that the steering system can be controlled by the steering wheel. In addition, the auxiliary steering device of the steering system includes a casing provided about the lower section of a steering drive shaft column and a driven gear fixed to the bottom end section of the steering drive shaft above the bracket plate. The auxiliary steering device also includes a hydraulic motor mounted to the casing, which hydraulic motor has a drive gear gearing into the driven gear fixed to the bottom end section of the steering drive shaft. The hydraulic motor is connected to a hydraulic pump through a hydraulic line, and the middle portion of the hydraulic line is provided with the foot-operated steering pedal. With the above structure, the power steering cylinder of the above steering system can be controlled by either the hand-operated steering wheel or the foot-operated steering pedal, thus to steer the wheels of the vehicle.

However, the above auxiliary steering device having the foot-operated steering pedal is mainly used for the power steering system so that the device has a complicated construction including the hydraulic cylinder, the hydraulic pump, the valves and the like. With the complicated construction of the auxiliary steering device, the above steering system is scarcely used for small-sized or middle-sized automobiles. Furthermore, as the above steering system is a power steering system, the steering power is not directly applied to the wheels of the vehicle, so that the steering system is not suitable for steering the wheels by working the foot-operated steering pedal during a high speed traveling of the vehicle such as on a high way, and this may cause trouble for the steering system while in operation.

If briefly described, the typical steering systems with the auxiliary steering devices having foot-operated steering pedals are not suitable for use in high speed vehicles but merely used in hydraulic heavy vehicles such as construction vehicles and agricultural vehicles during low speed traveling. The vehicles suitable for high speed travelling have only the steering wheels for a steering system, so that the steering systems cannot help being controlled by hands and thereby having the above-mentioned problems.

SUMMARY OF THE INVENTION

One object of the present invention is to provide an auxiliary steering device for a vehicle in which the above problems can be overcome and which includes a steering pedal and a mechanism for converting a reciprocation angular motion of the steering pedal into a rotating motion of a steering drive shaft of a main steering system. A further object is to let the main steering system be controlled by either the hand-operated steering wheel or the foot-operated steering pedal.

In the present invention, the foot-operated steering pedal of the auxiliary steering device is preferably worked by a left foot rather than a right foot used frequently during traveling of the vehicle, so that the steering pedal is preferably positioned on the bracket plate of the cab in the left side of the operator's seat such that the operator's left foot can be naturally placed on the steering pedal for working the steering pedal.

The auxiliary steering device transmits the reciprocation angular motion of the steering pedal to the main steering system of the vehicle, and converts the reciprocation angular motion into the rotating motion of the steering drive shaft extending from the steering wheel and appropriately controlling style, direction and size of the motion.

In order to accomplish the above object, the auxiliary steering device for a vehicle of the present invention generally includes i) means for enlarging the reciprocation angular motion of the foot-operated steering pedal by means of leverage, ii) means for turning the direction of the reciprocation angular motion of the steering pedal into the right-angled direction and transmitting the reciprocation angular motion to a crank lever and iii) crank means for converting the angular motion of the crank lever into rotating motions of bevel gears cooperating with a steering drive shaft of a main steering system.

In accordance with a preferred embodiment of the present invention, an auxiliary steering device for a vehicle comprises a) a driven bevel gear fixed to a steering drive shaft, b) a drive bevel gear gearing into the driven gear, c) a vertically levered steering pedal pivoted to a bracket plate so that the steering pedal is worked by a foot and generates a vertical reciprocation angular motion, d) means for converting the vertical reciprocation angular motion of the steering pedal into a rotating motion of the drive bevel gear, e) a recess formed in the front section of the steering pedal, f) an arm being pivoted to the bracket plate through a rotating shaft and turned about the rotating shaft in accordance with the reciprocation angular motion of the steering pedal, g) a lift lever for transmitting the reciprocation angular motion of the steering pedal to said arm, one end of the lift lever being received in the recess of the steering pedal and pivoted to the pedal in the recess, h) a slide hole formed in the top end of the arm for movably receiving the other end of the lift lever, i) a crank lever turned about the rotating shaft of the arm in accordance with the turning motion of the arm and j) a connecting rod for transmitting the turning motion of the crank lever to the drive bevel gear while converting the turning motion of the crank lever into the rotating motion of the drive bevel gear, the connecting rod being pivoted to the crank lever and to the drive bevel gear at its opposed ends, respectively, whereby the lift lever is not vertically movable relative to the recess of the steering pedal but horizontally rotatable about its pivot point in the recess of the pedal, thus to generate a vertical angular motion in accordance with a pedal operation.

The arm is preferably provided with a ball socket for receiving a ball, which ball has a slide hole for movably receiving an end of the lift lever.

The crank lever preferably has a ball socket, while an end of the connecting rod has a ball received in the ball socket of the crank lever, so that the connecting rod is jointed to the crank lever through a ball and socket joint.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
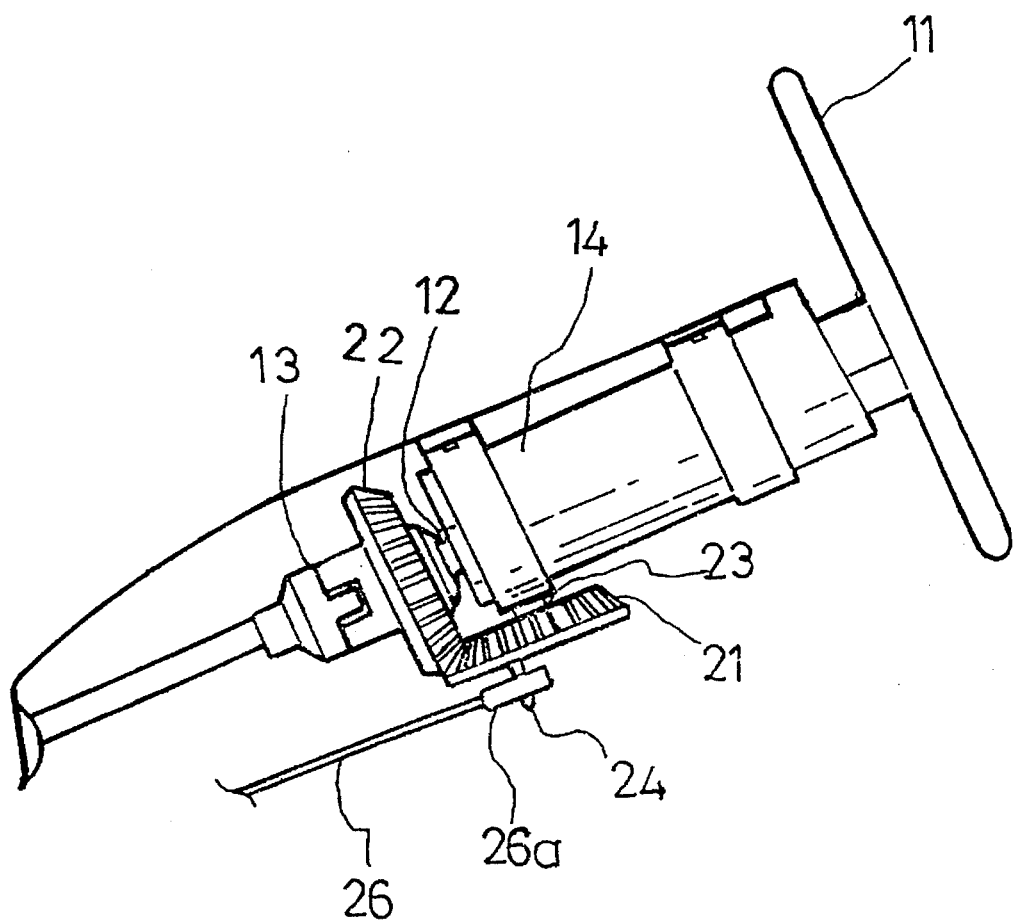
FIG. 1 is a side view of a steering system for a vehicle having an auxiliary steering device of the present invention.

FIG. 1 is a side view of a steering system for a vehicle having an auxiliary steering device of the present invention. As shown in this drawing, the steering system includes a driven bevel gear 22. Gear 22 is fixed to a steering drive shaft 12 extending from a steering wheel 11 over a joint 13 such that the gear 22 is rotated along with the steering drive shaft 12 of the steering wheel 11. The driven bevel gear 22 gears into a drive bevel gear 21 whose rotating shaft 23 is mounted to a side wall of a steering shaft column 14.

Figure 2:
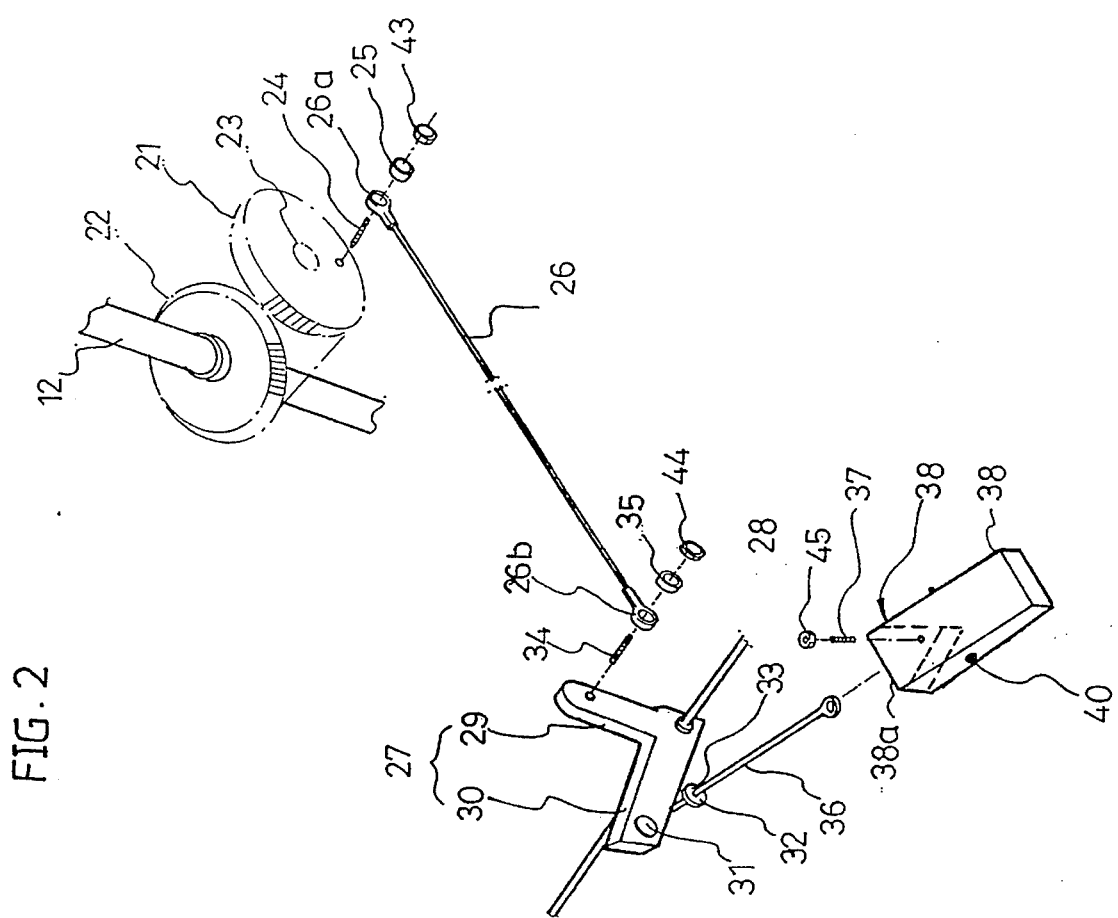
FIG. 2 is an exploded perspective view of an auxiliary steering device in accordance with a preferred embodiment of the present invention.
Figure 3:
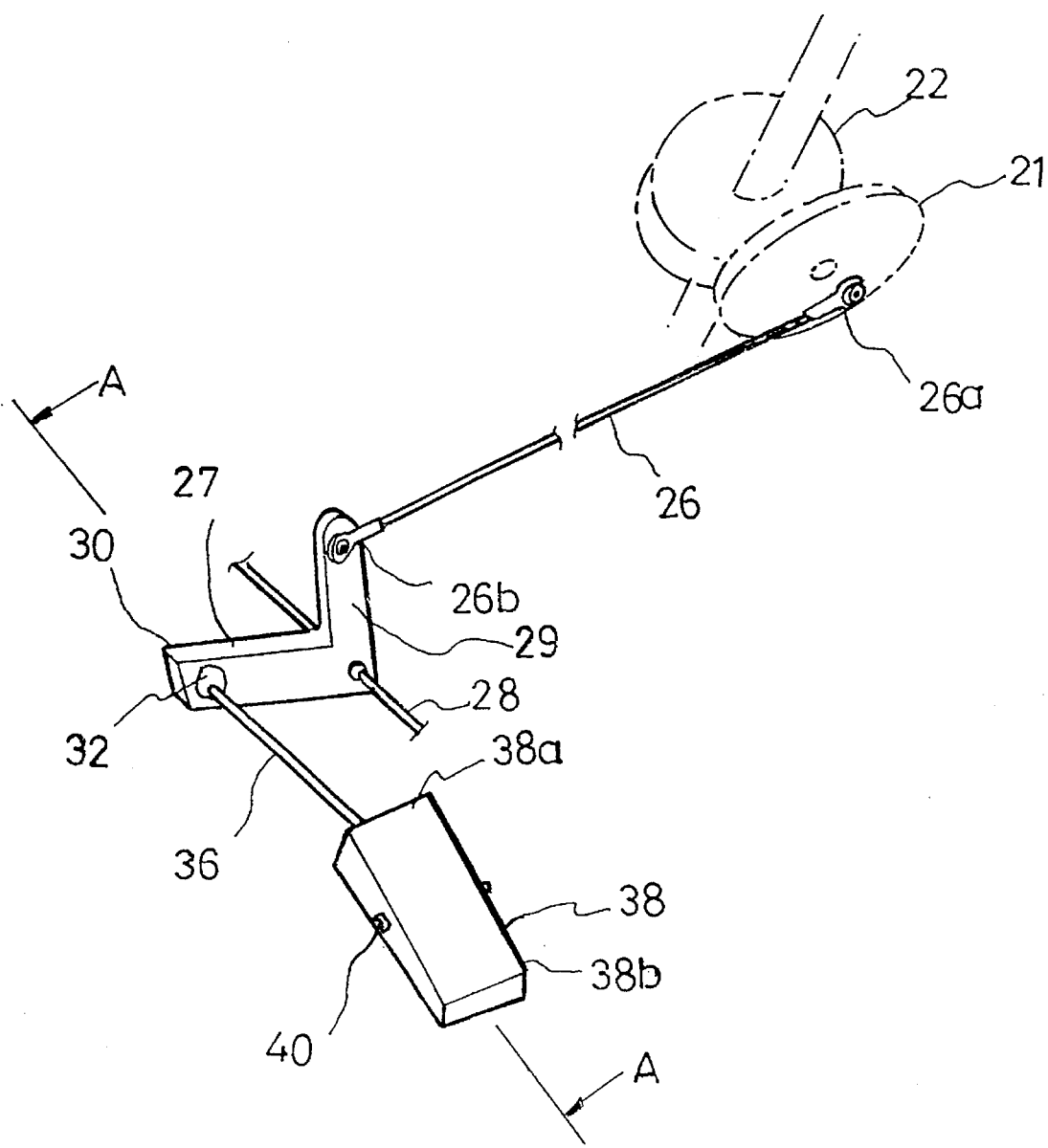
FIG. 3 is a perspective view of the auxiliary steering device of FIG. 2, showing the steering device kept in a state for straight traveling of a vehicle.

FIGS. 2 and 3 show an auxiliary steering device in accordance with a preferred embodiment of the present invention. As shown in the drawings, the outside surface of the drive bevel gear 21 is provided with an eccentric pin 24 which is eccentric from the rotating shaft 23 of the drive bevel gear 21. An end of a connecting rod 26 is pivoted to the eccentric pin 24 of the drive bevel gear 21. The other end of the connecting rod 26 is pivoted to a top end of a crank lever 29 using a pin 34. The crank lever 29 makes a reciprocating movement around a rotating shaft 28. Therefore, the crank lever 29 and the connecting rod 26 of the auxiliary steering device of the invention form a crank mechanism by the up and down movement of pedal 38. The above crank mechanism formed by the crank lever 29 and the connecting rod 26 converts reciprocation angular motion of the crank lever 29 into a rotating motion of the drive bevel gear 21.

In order to hinge the one end of the connecting rod 26 to the drive bevel gear 21, it is preferred that the one end of the connecting rod 26 is provided with a boss 26a, and the eccentric pin 24 of the drive bevel gear 21 is fitted in the boss 26a with interposition of a bearing 25, for achieving smoother power transmission. After fitting the eccentric pin 24 in the boss 26a, a snap ring 43 is tightly engaged with the pin 24 at the outside of the boss 26a so that sudden separation of the boss 26a from the pin 24 is prevented.

In order to pivot the other end of the connecting rod 26 to the crank lever 29, the top end of the crank lever 29 is provided with a pin 34 while the other end of the connecting rod 26 is provided with a boss 26b, and the pin 34 of the crank lever 29 is fitted in the boss 26b with interposition of a bearing 35, for achieving smoother power transmission. After fitting the pin 34 in the boss 26b, a snap ring 44 is tightly engaged with the pin 34 at the outside of the boss 26b so that sudden separation of the boss 26b from the pin 34 is prevented.

The end section of the arm 30 is provided with a slide hole for movably receiving one end of a lift lever 36. The other end of the lift lever 36 is pivoted to the front section 38a of a steering pedal 38 using a pin 37 and a snap ring 45. The diameter of the through hole of the arm 30 is larger than that of the lift lever 36 so that the lift lever 36 is somewhat playable in the through hole of the arm 30. When the lift lever 36 is playable relative to the through hole of the arm 30 as described above, the lift lever 36 can be slid in and turned about the through hole of the arm 30.

Figure 5:
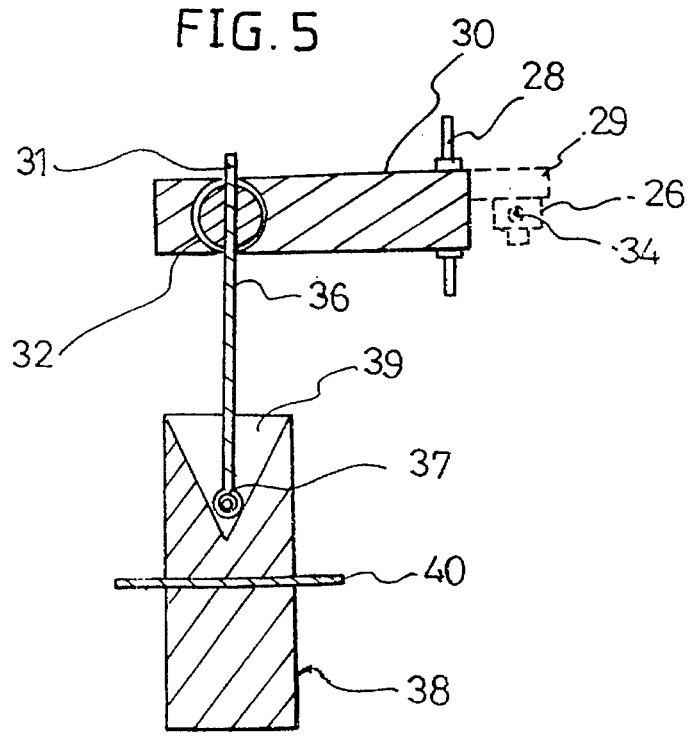
FIG. 5 is a sectional view of the auxiliary steering device taken along the section line B—B of FIG. 4.

In order to couple the lift lever 36 to the front section 38a of the steering pedal 38 in such a manner that the lever 36 generates a reciprocation angular motion in accordance with pedal operation, the front section 38a of the pedal 38 is provided with a triangular recess 39 as shown in FIG. 5. The other end of the lift lever 36 is pivoted to the front section 38a of the pedal 38 using the pin 37 in the inside corner of the triangular recess 39. As the other end of the lift lever 36 is received in the triangular recess 39 and pivoted to the inside corner of the triangular recess 39, the lever 36 is vertically movable with the steering pedal; that is, not vertically movable relative to the recess 39 but horizontally rotatable about its pivot point in the triangular recess 39 of the pedal 38. Therefore, the lever 36 generates a vertical angular motion and a horizontal reciprocation angular motion in accordance with a pedal operation. The center portion of the steering pedal 38 is pivoted using a pivot shaft 40. Shaft 40 transversely extends in the center of the pedal 38 and pivoted to the bracket plate 15, so that the front section 38a of the steering pedal 38 can be levered vertically about the center shaft 40 when working the pedal 38. Therefore, the steering pedal 38 generates the reciprocation angular motion through the lift lever 36.

The bottom surface of the steering pedal 38 is biased upward by a pair of bottom springs 41 and 42. Springs 41 and 42 are provided on the front and rear sections 38a and 38b of the bottom surface of the pedal 38, respectively. With the bottom springs 41 and 42, the front and rear sections 38a and 38b of the pedal 38 are elastically returned to their original positions when removing the foot from the pedal 38 after working the pedal 38. When the pedal 38 is in the original position, the steering system lets the vehicle travel straight.

Figure 8:
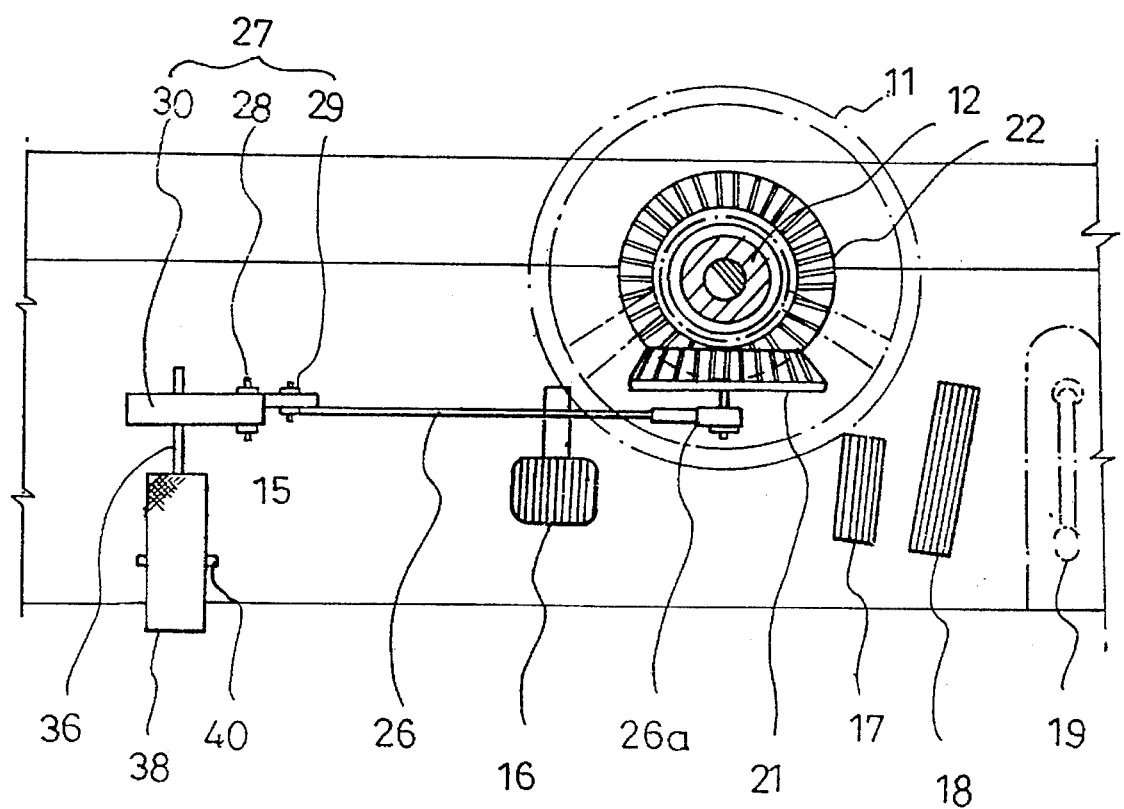
FIG. 8 is a plan view showing arrangement of a steering pedal of the auxiliary steering device of the invention relative to the other pedals in a cab of a vehicle.

And FIG. 8 shows arrangement of the steering pedal 38 of the auxiliary steering device of invention relative to the other pedals; that is, a clutch pedal 16, a brake pedal 17 and an accelerator pedal 18. In FIG. 8, the reference numeral 19 denotes a speed change lever.

Figure 4:
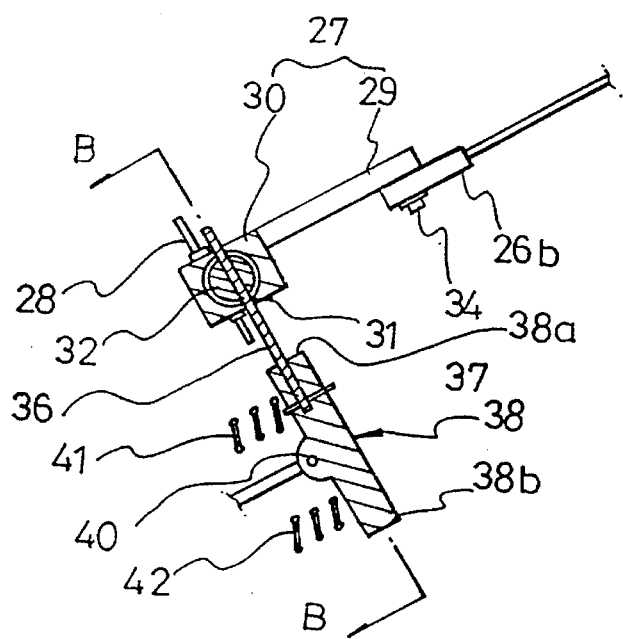
FIG. 4 is a sectional view of the auxiliary steering device taken along the section line A—A of FIG. 3.

In the second embodiment of the invention, in order to reduce the friction between the arm 30 and the lift lever 36 and to allow a smooth motion, the end section of the arm 30 is provided with a ball housing having a ball socket 31 for receiving a ball 32 therein as shown in FIGS. 4 and 5. The ball 32 is provided with a slide hole 33 for slidable reception of the one end of the lift lever 36. With the slidable insertion of the lift lever 36 in the slide hole 33 of the ball 32, the ball 32 sufficiently absorbs any deviation generated when converting the reciprocation angular motion of the lift lever 36 into an angular motion of the arm 30. When there is the ball and socket joint for pivoting the lift lever 36 to the arm 30, it is not necessary to make the diameter of the slide hole 33 of the ball 32 be larger than that of the lift lever 36.

In the third embodiment of the invention, the joint between the other end of the connecting rod 26 and the top end of the crank lever 29 may be achieved by a ball and socket joint. In the ball and socket joint, the other end of the connecting rod 26 is formed into a ball, while the top end of the crank lever 29 is provided with a ball socket for receiving therein the ball of the connecting rod 26. The ball and socket joint is more profitable than the above pin coupling because the ball and socket joint forms a spherical pair instead of turning pair. In the forth embodiment of the invention, the crank lever 29 is integrated with an arm 30 into a single body. That is, the arm 30 extends from the bottom section of the crank lever 29 at an angle there between so that the arm 30 and the lever 29 form an L-shaped lever body 27, which is rotatable about the rotating shaft 28. Herein below, the operation of the steering system having the above auxiliary steering device will be described with reference to the accompanying drawings.

The steering system of FIG. 3 lets the vehicle travel straight. When the steering pedal 38 in the state is kept by fixing the pedal 38 using the foot, the bevel gears 21 and 22 gearing into each other and the steering wheel 11 are fixed to the straight traveling state, so that the vehicle keeps traveling straight even when the operator's hands are free from the steering wheel 11.

Figure 6:
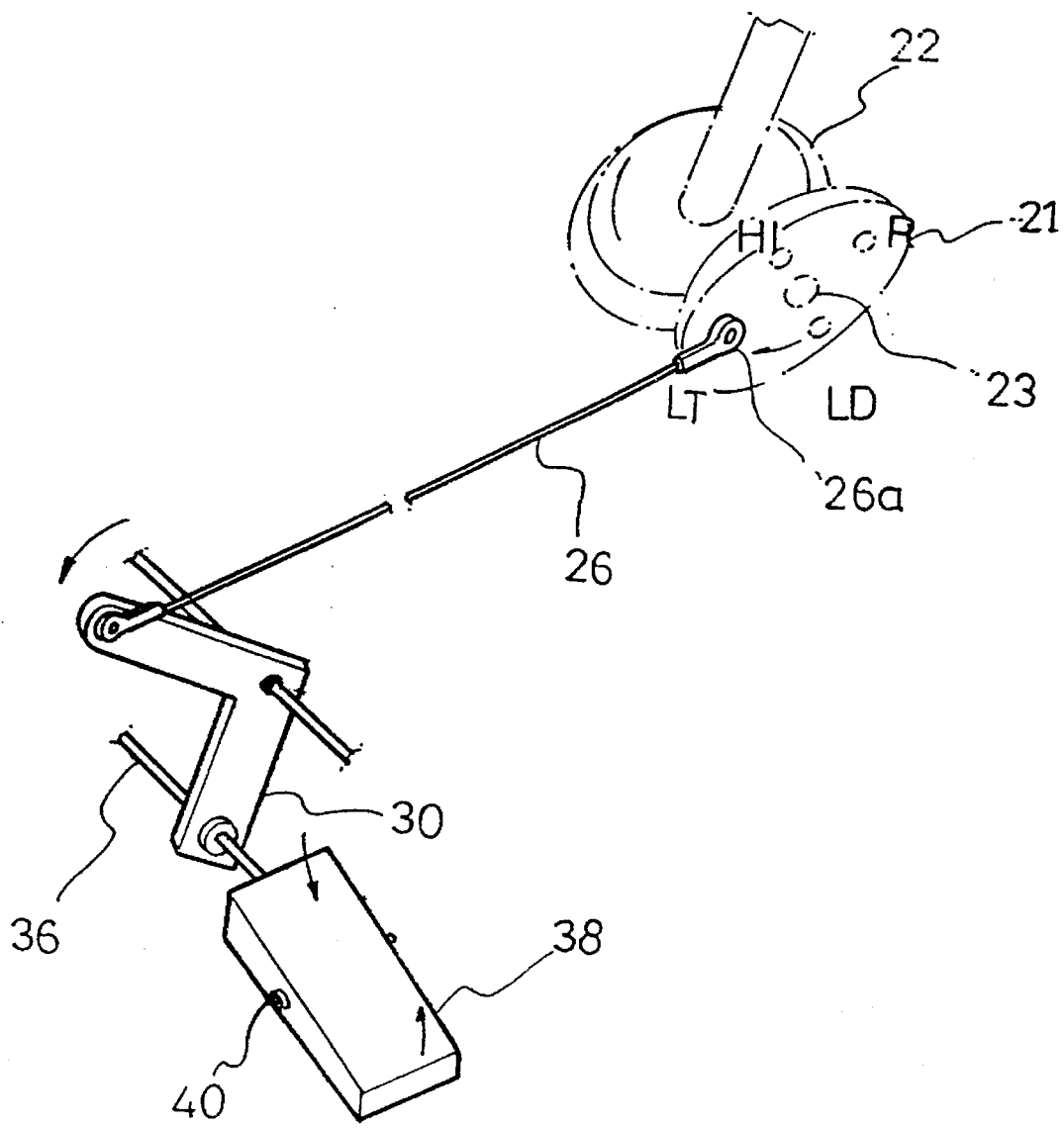
FIG. 6 is a perspective view of the auxiliary steering device of FIG. 2, showing the steering device in a wheel steering state for turning the vehicle rightward.
Figure 7:
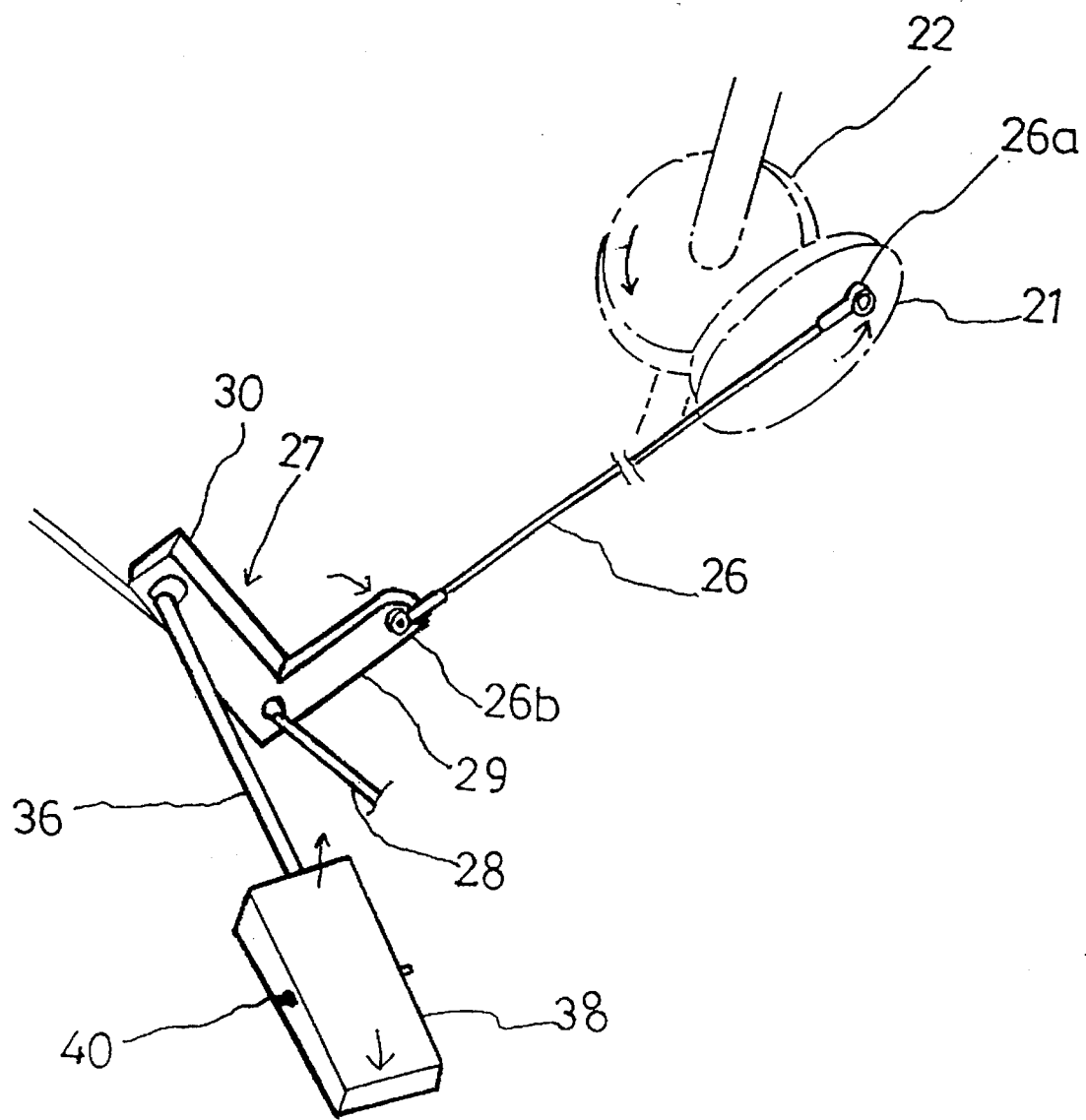
FIG. 7 is a perspective view of the auxiliary steering device of FIG. 2, showing the steering device in a wheel steering state for turning vehicle leftward.

FIG. 6 shows the auxiliary steering device of invention when steering the wheels in order for turning the vehicle rightward. FIG. 7 shows the auxiliary steering device when steering the wheels in order for turning the vehicle leftward. When the steering pedal 38 is worked so that the front section 38a of the pedal 38 is pushed down as shown at the arrow of FIG. 6, the L-shaped lever body 27 is turned about the rotating shaft 28 counterclockwise due to leverage of the lift lever 36. The counterclockwise turning motion of the lever body 27 about the shaft 28 is transmitted to the drive bevel gear 21 through the connecting rod 26 and thereby rotates the gear 21 clockwise. The clockwise rotating motion of the drive bevel gear 21 is transmitted to the steering drive shaft 12 through the driven bevel gear 22 gearing into the drive bevel gear 21, thus to rotate the drive shaft 12 rightward and to turn the vehicle rightward. On the other hand, when the steering pedal 38 is worked so that the rear section 38b of the pedal 38 is pushed down as shown at the arrow of FIG. 7, the lever body 27 is turned about the rotating shaft 28 clockwise due to leverage of the lift lever 36. The clockwise turning motion of the lever body 27 about the shaft 28 is transmitted to the drive bevel gear 21 through the connecting rod 26 and thereby rotates the gear 21 counterclockwise. The counterclockwise rotating motion of the drive bevel gear 21 is transmitted to the steering drive shaft 12 through the driven bevel gear 22, thus to rotate the drive shaft 12 leftward and to turn the vehicle leftward. When working the steering pedal 38 in order to turn the vehicle to either side, the operator naturally uses the left foot because the pedal 38 is positioned in the left side of the operator's seat, as shown in FIG. 8.

The above-mentioned steering operations using the foot-operated steering pedals 38 are effective only when the eccentric pin 24 of the drive bevel gear 21 is positioned within the range including the points "LT", "LO" and "RT" of FIG. 6. However when the eccentric pin 24 of the drive bevel gear 21 is positioned within the range including the points "LT", "HI" and "RT" of FIG. 6, the above-mentioned steering operations using the foot-operated steering pedals 38 will be reversed. In the steering system, the eccentric pin 24 of the drive bevel gear 21 may be positioned in either of the four points "LT", "LO", "RT" and "HI" when controlling the steering system by the steering wheel 11. However, the control for the steering system by the steering pedal 38 is only effective within the range of ±90 leftward and rightward turning angle of the drive bevel gear 21. When the vehicle travels straight, the eccentric pin 24 of the drive bevel gear 21 is always positioned on the point "LO" due to restoring force of the steering wheel 11. In addition, the steering system is sufficiently controlled by ±20 leftward and rightward turning angle of the drive bevel gear 21 when the vehicle travels on a straight road such as a high way. Therefore, there is no problem in controlling the steering system by the foot-operated steering pedal 38 of the auxiliary steering device of the invention. As shown in FIG. 8, the steering pedal 38 is positioned in the left side of the operator's seat so that the steering system having the auxiliary steering device of this invention can be naturally controlled by the foot-operated steering pedal 38 without handling the steering wheel 11. This facilitates the steering operation for the vehicle.

In the present invention, the steering pedal 38 preferably has a size similar to that of another pedal, such as the brake pedal 17 or the accelerator pedal 18. The inclination angle of the steering pedal 38 in the straight traveling state is equal to that of the bracket plate 15. In addition, it is preferred to make the front section 38a of the steering pedal 38 be vertically reciprocated within ±4 cm range. The size of the lever body 27, the length of the arm 30 and the sizes of the bevel gears 21 and 22 may be changed in accordance with conditions of a vehicle to which the auxiliary steering device of this invention is installed. However, it is preferred to let the diameter of the driven bevel gear 22 be less than that of the steering wheel 11 so that the hand-operated steering motion is not disturbed by the foot-operated steering motion when makes controlling the steering system by both.

With the above auxiliary steering device, the steering system can be desirably controlled by a foot particularly when the vehicle travels on a straight road such as a highway having good driving conditions. That is, the steering system with the above auxiliary steering device can be controlled by either of an exclusive hand operation, an exclusive foot operation or a hand and foot operation. Therefore, the steering system can be controlled by either of the above three operation types in accordance with road conditions and operator's conditions. When the steering system is controlled by the foot-operated steering pedal, the operator's hands are free from the steering operation so that the operator in operation of the vehicle may use his or her hands to operate a portable phone, handle the dashboard or the stereo system, enjoy something to eat or drink, or smoke without the danger of having a traffic accident. Of course, when the operator of the vehicle feels sleepy, the operator may exercise, such as stretching the body with raised hands, while controlling the steering system by the foot-operated steering pedal.

The steering pedal is positioned in the left side of the operator's seat so that the operator naturally uses the left foot when working the steering pedal for controlling the steering system by the pedal. The auxiliary steering device has a simple construction so that the device is free from a problem caused by operational trouble and cost. The auxiliary steering device may be simply used with typical vehicles without changing the constructions of the vehicles. The steering system of the invention can be controlled by either the hands or the foot so that the operator may use the hand sense as well as the foot sense during operation of the vehicle and this prevents possible traffic accident. Furthermore, the steering pedal of the auxiliary steering device is connected to the steering handle through a mechanical mechanism so that the operators may appropriately work the pedal without special exercise for operating the pedal. When the vehicle travels on a rapidly curved road, the normal steering state of the steering system controlled by the steering wheel is returned by simple separating of the foot from the steering pedal. Hence, there is no problem in use of the auxiliary steering device in conventional steering systems.

As described above, the present invention provides an auxiliary steering device for vehicle including a mechanism for converting a reciprocation angular motion of a steering pedal into a rotating motion of a steering drive shaft of the steering system, so that the auxiliary steering system lets the steering system be controlled by either the hand-operated steering wheel or the foot-operated steering pedal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An auxiliary steering device for a vehicle comprising:

a steering drive shaft;

a driven bevel gear fixed to said steering drive shaft;

a drive bevel gear gearing into said driven bevel gear;

a vertically levered steering pedal being worked by a foot so as to generate a vertical reciprocation angular motion; and means for converting the vertical reciprocation angular motion of the steering pedal into a rotating motion of said drive bevel gear, said means for converting further comprising:

a recess formed in a front section of said steering pedal;

an arm being turned about a rotating shaft in accordance with a reciprocation angular motion of said steering pedal;

a crank lever for making a reciprocating movement around said rotating shaft in accordance with a turning motion of said arm;

a lift lever for transmitting a reciprocation angular motion of said steering pedal to said arm and having two ends, one end of said lift lever being received in said recess of the steering pedal and pivoted to said pedal in said recess and the other end of said lift lever being connected to the other end of said arm;

a slide hole formed in an end section of said arm for movably receiving said other end of said lift lever; and a connecting rod for transmitting a turning motion of said crank lever to said drive bevel gear while converting said reciprocating movement of the crank lever into said rotating motion of the drive bevel gear, said connecting rod being eccentrically pivoted to said crank lever and to said drive bevel gear at its opposed ends;

whereby said lift lever is vertically movable with the steering pedal and horizontally rotatable about its pivot point in the recess of the pedal so as to generate a vertical angular motion and a horizontal reciprocation angular motion in accordance with a pedal operation.

2. The auxiliary steering device for a vehicle according to claim 1, wherein said arm is provided with a ball socket for receiving a ball, said ball having a slide hole for movably receiving said opposite end of said lift lever.

3. The auxiliary steering device for a vehicle according to claim 2, wherein said arm is integrated with said crank lever in a substantially L-shaped lever body rotatable about said rotating shaft.

4. The auxiliary steering device for a vehicle according to claim 3, wherein said crank lever has a ball socket while an end of said connecting rod has a ball received in said ball socket of the crank lever.

5. The auxiliary steering device for a vehicle according to claim 1, wherein said arm is integrated with said crank lever in a substantially L-shaped lever body rotatable about said rotating shaft.

6. The auxiliary steering device for a vehicle according to claim 1, wherein said crank lever has a ball socket while an end of said connecting rod has a ball received in said ball socket of the crank lever.

* * * * *